US008797940B2

(12) United States Patent
Rácz et al.

(10) Patent No.: US 8,797,940 B2
(45) Date of Patent: Aug. 5, 2014

(54) SETUP AND CONFIGURATION OF RELAY NODES

(75) Inventors: András Rácz, Budapest (HU); Göran Selander, Bromma (SE); Mats Näslund, Bromma (SE); Luis Barriga, Johanneshov (SE); Magnus Lindström, Spånga (SE); Gunnar Mildh, Sollentuna (SE); Niklas Johansson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/255,306

(22) PCT Filed: May 20, 2009

(86) PCT No.: PCT/SE2009/050569
§ 371 (c)(1),
(2), (4) Date: Sep. 8, 2011

(87) PCT Pub. No.: WO2010/104435
PCT Pub. Date: Sep. 16, 2010

(65) Prior Publication Data
US 2012/0002594 A1    Jan. 5, 2012

Related U.S. Application Data

(60) Provisional application No. 61/159,192, filed on Mar. 11, 2009.

(51) Int. Cl.
*H04W 88/04* (2009.01)
*H04W 80/04* (2009.01)
*H04W 88/06* (2009.01)

(52) U.S. Cl.
USPC ............ 370/315; 370/252; 370/254; 370/328

(58) Field of Classification Search
CPC .... H04B 7/2606; H04W 88/04; H04W 80/04; H04W 88/06; H04L 47/10; H04L 43/50; H04L 41/12; H04L 45/02
USPC .................................. 370/252, 254, 315, 328
See application file for complete search history.

(56) References Cited

U.S. PATENT DOCUMENTS

| 2007/0097905 A1 | 5/2007 | Suh et al. | |
| 2008/0080399 A1* | 4/2008 | Wang et al. | 370/254 |
| 2008/0233963 A1* | 9/2008 | Alanara et al. | 455/438 |
| 2009/0207855 A1* | 8/2009 | Watanabe | 370/466 |

FOREIGN PATENT DOCUMENTS

| CN | 1540899 A | 10/2004 |
| CN | 1758596 A | 4/2006 |

(Continued)

OTHER PUBLICATIONS

U.S. Appl. No. 61/098,367, filed Sep. 2008, Dahlman.*

(Continued)

*Primary Examiner* — Ronald Abelson
(74) *Attorney, Agent, or Firm* — Leffler Intellectual Property Law, PLLC (57) ABSTRACT

Systems and methods for the configuration of network nodes without a secured connection in a telecommunications system are described herein. These network nodes can be wireless network nodes which are part of the network infrastructure, such as, wireless relays, wireless repeaters and self-back-hauled eNodeBs.

21 Claims, 6 Drawing Sheets

(56) References Cited

FOREIGN PATENT DOCUMENTS

| CN | 101292558 A | 10/2008 | | |
|---|---|---|---|---|
| DE | 10 2005 046742 A1 | 4/2007 | | |
| EP | 1 633 108 A1 | 3/2006 | | |
| WO | 2007/046630 A2 | 4/2007 | | |
| WO | 2008/042414 A2 | 4/2008 | | |
| WO | WO 2010/033065 | * | 3/2010 | ............ H04W 16/26 |

OTHER PUBLICATIONS

PCT International Search Report, mailed Dec. 2, 2009, in connection with International Application No. PCT/SE2009/0504569.

International Preliminary Report on Patentability, completed Jun. 7, 2011, in connection with International Application No. PCT/SE2009/0504569.

Third Generation Partnership Project 33.812, V1.3.0, Technical Specification Group Services and Systems Aspects; Feasibility Study on Remote Management of USIM Application on M2M Equipment; Release 9, Feb. 2009.

Chinese Office Action, dated Sep. 3, 2013, in connection with counterpart Chinese Patent Application No. 200980158049.7 (translation), all pages.

Chinese Search Report, dated Aug. 23, 2013, in connection with counterpart Chinese Patent Application No. 200980158049.7 (translation), all pages.

* cited by examiner

FIG. 6

SETUP AND CONFIGURATION OF RELAY NODES

CROSS REFERENCE TO RELATED APPLICATIONS

This application claims the benefit of U.S. Provisional Application No. 61/159,192, filed Mar. 11, 2009, which is hereby incorporated herein by reference in its entirety.

TECHNICAL FIELD

The present invention relates generally to communications and in particular to methods, devices and systems for the provisioning of wireless relay nodes in a telecommunications system.

BACKGROUND

Radiocommunication networks were originally developed primarily to provide voice services over circuit-switched networks. The introduction of packet-switched bearers in, for example, the so-called 2.5 generation (G) and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

Taking the LTE technology as an example, as this new technology is deployed in more locations, more infrastructure, e.g., network nodes, will need to be deployed so that mobile users can take advantage of the service options which are available via this technology. This can be particularly relevant for wireless relay nodes which may need to be rapidly and smoothly deployed, e.g., to temporarily improve coverage of the radio access network. In a traditional Operation and Maintenance (O&M) configuration procedure, new network nodes are expected to have connectivity established to the Operations and Support System (OSS) prior to beginning their configuration, i.e., the new network node is typically expected to have a secure connection to the OSS prior to configuring that node for operation in the network.

Accordingly, systems and methods for the configuration of network nodes which lack such a secure connection in a telecommunications system are desirable.

SUMMARY

These and other objects, features and advantages of exemplary embodiments are described herein, wherein relay nodes are described which use a same wireless interface as does the user equipment to connect with the network. Methods, systems and devices for configuring such relay nodes using that same wireless interface are described, some of which use network-based mechanisms which are also used by the user equipment to attach/authenticate with the network. After they are connected to the network, such relay nodes can then operate to relay signals to and from user equipment and the network.

According to an exemplary embodiment a method for configuring a wireless relay node in a telecommunications network is described. The wireless relay node connects via a wireless interface, which is the same wireless interface used by user equipment to transmit and receive data, with the telecommunications network using first configuration data. After connecting wirelessly with the network, the wireless relay node is authenticated with the telecommunications network using the first configuration data. The wireless relay node then receives second configuration data from the telecommunications network, which it uses to enter an operational mode. At this time, the wireless relay node is able to relay data received from user equipment over the wireless interface toward the telecommunications network.

According to another exemplary embodiment, a wireless relay node includes a processor and a communications interface. The processor is, for example, configured to use first configuration data to allow the wireless relay node to connect wirelessly to a telecommunications network, using the same wireless interface via which user equipment transmits and receives data. The wireless relay node authenticates with the telecommunications network using the first configuration data, after which the communications interface receives second configuration data from the telecommunications network. The processor uses the second configuration data to configure the wireless relay node for normal operations, at which time the wireless relay node relays data received from user equipment toward the telecommunications network using the same wireless interface.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
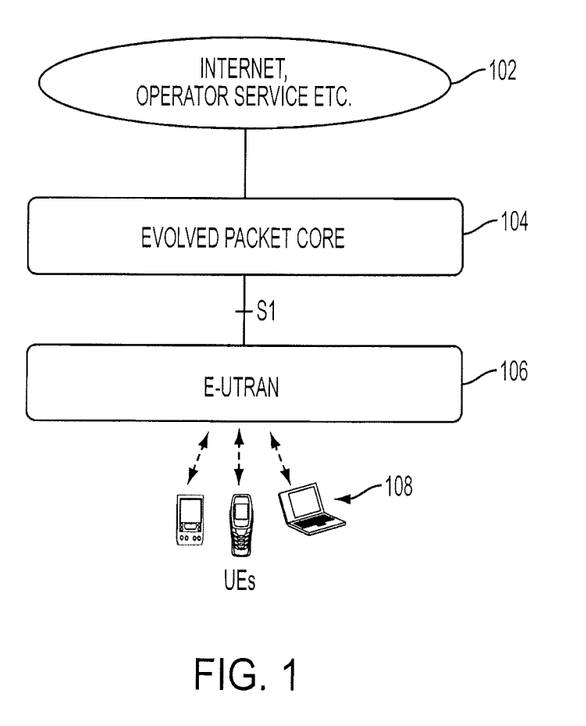
FIG. 1 depicts an overview of a system within which wireless relay nodes can be deployed according to exemplary embodiments.

As wireless telecommunications systems expand and are upgraded, nodes are deployed which need to be provisioned. "Provisioning", as used herein, denotes the general process of providing a node with initial configuration data that is then used by the node to enter active service as part of the network. Prior to discussing the exemplary embodiments below, a purely illustrative overview of a system in which nodes can be deployed and provisioned, e.g., wireless relay nodes, will now be described with respect to FIG. 1 to provide some context for this discussion.

According to exemplary embodiments, a communication system in which wireless relay nodes can be deployed includes various user equipment (UE) 108, e.g., mobile phones, laptop computers and personal digital assistants (PDAs), which communicate over a wireless interface with an Evolved Universal Terrestrial Radio Access Network (E-UTRAN) 106. The E-UTRAN 106 communicates with nodes in the Evolved Packet Core (EPC) 104 over the S1 interface(s). The EPC 104 can then route calls/requests from the UEs 108 to various separate networks and services as shown generally by the Internet/Operator Service 102. The E-UTRAN 106 may use wired or wireless nodes to support communication with UEs 108. Wireless relay nodes, as the phrase is used herein include, for example, repeaters, relays, self-backhauled eNodeBs (eNBs) and the like. More specifically, a repeater is a layer 1 (L1) amplifier device which receives a transmission from, e.g., a UE 108, amplifies the received transmission without decoding it, and retransmits it to, e.g., the network. A relay is a node that decodes a transmission and forwards it onwards after coding the data again. A self-backhauled eNodeB is similar to a regular eNodeB with the exception that its backhaul link is provided by an LTE radio interface instead of a wired network connection. In the following description these and other, similar devices will be referred to as eNodeRs (eNRs). Although the exemplary system of FIG. 1 includes an E-UTRAN 106, it will be appreciated by those skilled in the art that the present invention is not limited to usage in conjunction with an E-UTRAN wireless communication system and can, instead, be used with any wireless communication system.

Figure 2:
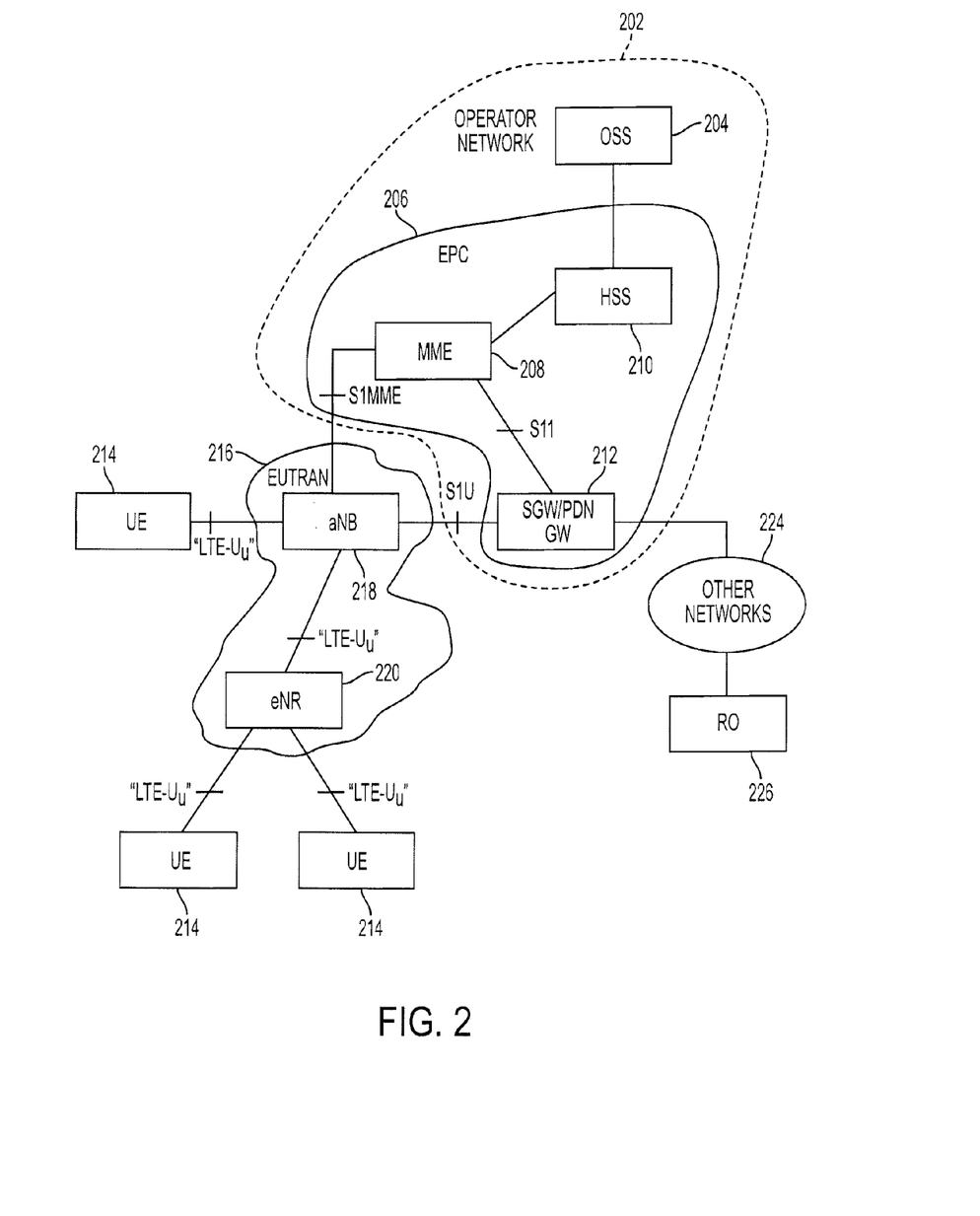
FIG. 2 illustrates an operator network in communication with an Evolved Universal Terrestrial Radio Access Network (E-UTRAN) in which an eNodeR (eNR) is deployed according to exemplary embodiments.

According to exemplary embodiments, a long term evolution (LTE) radio access network (RAN)/system architecture evolution (SAE) network can include various control functions and nodes for radio resource management. For example, FIG. 2 shows an Operator Network 202 which includes an Operations Support System (OSS) 204 and an Evolved Packet Core (EPC) 206. An OSS 204 can generally perform functions such as order processing, billing, fault management, configuration of network components and other operations/maintenance support functions. The EPC 206 includes a mobility management entity (MME) 208 which can perform (and/or support) various functions of the RAN such as, bearer management functions, authentication and gateway selection. The home subscriber server (HSS) 210 is a database containing subscriber information which supports authentication/authorization issues associated with UEs 214 (and other nodes). The EPC 206 also includes a Serving SAE Gateway (SGW)/Packet Data Network SAE Gateway (PDN GW) 212. The SGW function performs a variety of tasks, such as packet routing and forwarding, mobility anchoring for inter-3GPP mobility as well as being the gateway which terminates the interface towards the E-UTRAN 216. The PDN GW (PGW) function also performs a variety of tasks, such as IP address allocation for nodes, and is a link to other networks 224, e.g., the Internet, and services such as those provided by a Registration Operator (RO) 226 which can act as a broker for operators and perform a hosted discovery service. The roles of which are described in more detail below. Additionally, while shown as a single entity, the SGW/PDN GW 212 can be implemented as separate entities within the EPC 206.

The E-UTRAN 216 includes an anchor eNodeB (aNB) 218 which communicates with the EPC 206 over versions of the S1 interface, e.g., S1 MME and S1U. Additionally, the aNB 218 can communicate wirelessly with other nodes, e.g., UE 214 and the eNR 220, over a wireless interface denoted by "LTE-Uu". Once the eNR 220 is operational, i.e., fully provisioned and accepted by the network, other UEs 214 will be able to connect to the network through the eNR 220 using the same interface, e.g., the "LTE-Uu" interface, which is in communications with the aNB 218. Although only one eNodeB 218 is shown in FIG. 2 to simplify the figure, it will be appreciated by those skilled in the art that E-UTRAN implementations will typically include more than one eNodeB.

According to exemplary embodiments, the wireless relay that is to be configured will become a part of the network infrastructure itself once it enters an operational mode, e.g., an eNR 220 which will provide connectivity service to regular users, and the wireless relay will also use the same network infrastructure for its own connectivity purposes to reach the OSS 204 as part of its configuration and/or provisioning prior to entering an operational mode, i.e., the eNR 220 can use the same interface to connect with the network for configuration and provisioning that it uses for relaying and communicating with UEs 214. The establishment of basic connectivity with the network infrastructure is part of the process whereby the wireless relay node 220 is setup and configured, e.g., during provisioning. In addition to establishing this basic (wireless) connectivity with the rest of the network, other factors can also be taken into consideration for provisioning, such as, the potential need to notify other nodes of the presence of the wireless relay node 220. For example, as the eNR 220 being added to the communication network is provisioned, other network nodes taking part in providing the connectivity services are aware (or need to become aware) that the eNR 220 is an entity which is part of the infrastructure and therefore may need to be treated differently than a UE 214. That is, certain network nodes like the aNB 218 will know or learn that the eNR 220 has different functionality and responsibilities as compared to a UE 214 despite the fact that they are both connected to the network via the same wireless interface.

According to exemplary embodiments, a method for securely configuring a wireless relay node can use the same wireless communication interface to connect to the network infrastructure as the communication protocols which are used to provide access services for UEs 214. An exemplary configuration method can, for example, provision an eNR 220 with operational Universal Service Identity Module (USIM) credentials and other operator specific configuration data from a home operator. Additionally, exemplary embodiments can establish the desired security for an eNR 220, as it transitions from its initial state from the factory where it was manufactured, e.g., without any binding to an operator and separated from all networks, to becoming a trusted and integrated component of a particular operator's network.

Prior to provisioning a new eNR 220, the eNR 220 can be subjected to steps associated with pre-provisioning and on-site deployment. For the (optional) pre-provisioning, applications and data may be stored in the eNR 220 that can subsequently be used to obtain basic network connectivity, to obtain management system capabilities or to support subsequent provisioning of applications or data. Examples of data which can be pre-provisioned in an eNR 220 include an identifier of the eNR 220, security data such as cryptographic keys and public key certificates, and address information such as Fully Qualified Domain Names (FQDNs). An example of an application which can be pre-provisioned in the eNR 220 is a USIM application, which performs third Generation Partnership Project (3GPP) Authentication and Key Agreement (AKA) operations. Pre-provisioning can take place in a factory (by the manufacturer) or in a warehouse (by the operator). Additionally, the manufacturer of the eNR 220 may support the subsequent provisioning by implementing or installing applications or data, or by integrating external interfaces to facilitate deployment.

A goal of pre-provisioning and provisioning during deployment according to exemplary embodiments is to enable the eNR 220 to become configured with USIM credentials which are sufficient to establish initial connectivity using, for example, a procedure similar to the UE attach procedure. Additionally, the pre-provisioning and/or provisioning process can provide the eNR 220 with information regarding how to use its initial connectivity (i.e., what signals to send to complete the configuration procedure). Moreover, some data provisioned at this time may be used to bootstrap the O&M security process.

Figure 3:
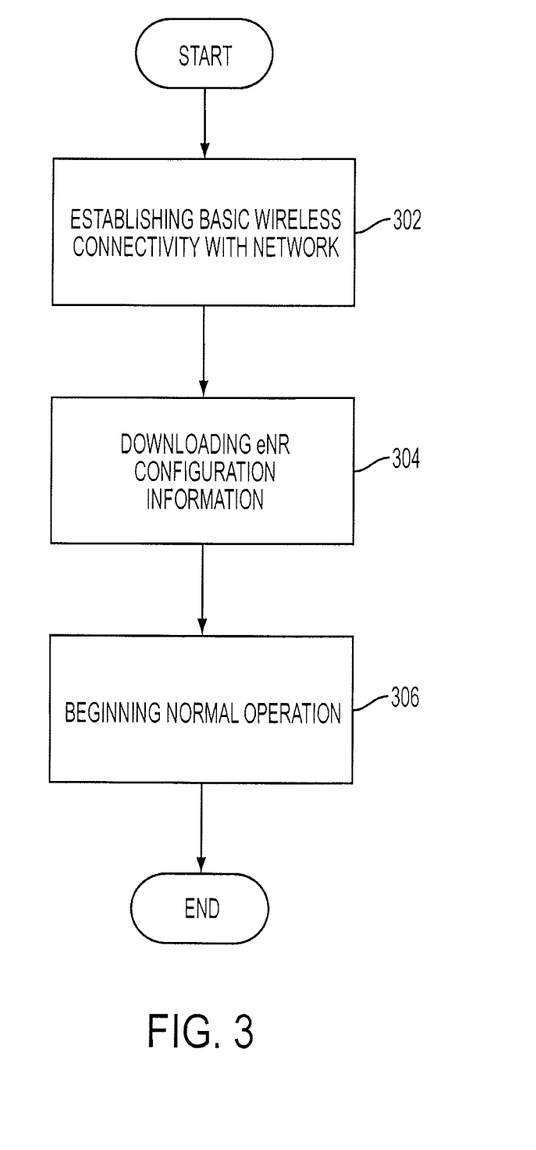
FIG. 3 shows a flowchart of a method for provisioning an eNR according to exemplary embodiments.

After this (optional) pre-provisioning occurs, the eNR 220 is deployed on-site, e.g., the eNR 220 is assembled with cables connected to an antenna, power source and the like at the location of installation. Before or after the power is turned on to the eNR 220, during the deployment phase, there may be some additional configuration performed by, e.g., a Universal Integrated Circuit Card (UICC) which may be placed in a card reader (not shown in FIG. 2, see e.g., FIG. 5) connected to the eNR 220. A computing device or processor (not shown in FIG. 2, see, e.g., FIG. 5) may be connected to the eNR 220 for uploading provisioning data (keys, one-time passwords, identifiers, addresses, root certificates, fingerprints) or applications (e.g., a USIM application), from the UICC card reader which can include and read the USIM card containing this information, on the eNR 220. Alternatively, other input devices could be used instead of a UICC card reader to load provisioning data into the eNR 220 at the deployment site. After deployment provisioning can be performed, according to exemplary embodiments, as shown in the flowchart of FIG. 3 and described below.

As described above, some provisioning of data and/or applications for a wireless relay node may occur at the factory or at the deployment site prior to connecting an eNR 220 to the network. However, some or all of the provisioning may also occur once the wireless relay node is connected to the network via the air interface. According to exemplary embodiments, provisioning of an eNR 220 can thus include the following steps: (1) establishing basic wireless connectivity with the network in step 302; (2) downloading eNR 220 configuration information in step 304; and (3) beginning normal operation in step 306. At startup the eNR 220 may perform a procedure similar to a legacy UE Attach procedure, to the LTE network using the USIM credentials (if available) and specifying a special Access Point Name (APN) used for providing network internal connectivity for the eNR 220 via the radio interface. This makes it possible to provide IP connectivity to wireless relay nodes, e.g., eNR 220, on an operator internal IP network separate from the IP network used by normal end users, e.g., UE 214.

The HSS 210 subscription data, which may be preconfigured in the HSS 210 from the OSS 204, may include the IP address, the PDN Gateway to be assigned and the QoS profile for the default bearer providing the basic connectivity for the eNR 220. The MME 208 serving the eNR 220 can then obtain the subscription data from the HSS 210. Note that in one possible embodiment the MME serving the eNR may be integrated into the anchor eNB, instead of being a stand alone node. The MME 208 can then authenticate the eNR 220 and establish the bearer services in the aNB 218 and in the SGW/PGW 212 accordingly. According to one exemplary embodiment, the eNR 220 uses provisioned USIM credentials to perform 3GPP AKA options and derive keys for encryption and integrity protection over the air interface, in a format similar to that performed by a UE 214 for establishing connectivity with the network. If the connectivity was established based on credentials issued by the home operator owning the network into which the eNR 220 is being configured then this method can also be used to reconnect eNR 220 at a later time.

However, according to other exemplary embodiments, in the case of wherein a Downloadable USIM as described in 3GPP TR 33.812 is used, the initial connectivity can be based on a "one-time-USIM" issued by a Registration Operator (RO) 226. The purpose of the initial connectivity in such embodiments is to connect the eNR 220 to an RO 226 and, through its hosted discovery service, discover the home operator of the network, from which home operator USIM credentials are then downloaded to the eNR 220. Using these ultimate USIM credentials, basic connectivity can be established as described above.

As a part of the establishing basic wireless connectivity with the network step 302, eNR 220 Operations and Maintenance (O&M) security bootstrapping can occur (alternatively this security bootstrapping could be performed as a separate step) as will now be described. After the basic connectivity, i.e., the default bearer, is established for the eNR 220, the eNR 220 contacts the OSS 204 to become enrolled with the management system of the operator network 202. This could include, for example, performing a PKCS #10 enrollment procedure (which is a certification request syntax standard for public keys), whereby the eNR 220 requests a public key certificate issued by the OSS 204 Public Key Infrastructure (PKI) system. The Simple Certificate Enrollment Protocol (SCEP) is an exemplary protocol which can be used for this process.

The request may contain a logical identifier of the eNR 220, the public key of the eNR 220, a one-time password (OTP) and be signed with the private key of the eNR 220. The OTP may be encrypted to avoid man-in-the-middle attacks and other undesired outside interference. This can be performed by using Transport Layer Security (TLS) with server certificates, in which case the server certificate needs to be verified and deemed trustworthy. One method for performing this verification is through the provisioning of root certificates or fingerprints thereof which enable the eNR 220 to verify the server certificate. Therefore, according to one exemplary embodiment, a successful enrollment can use a public key certificate containing the eNR 220 logical identifier, the public key of the eNR 220, and other data, all of which can be signed by the Certification Authority of the OSS 204 PKI. Alternatively, such a certificate may be provisioned to the eNR 220 in the warehouse or during deployment, in which case this step may be omitted. Additionally, according to exemplary embodiments, subsequent TLS-protected communication between the eNR 220 and OSS 204 can be set up using this certificate.

After having enrolled with the management system of the network, the eNR 220 contacts the OSS 204 to establish TLS and download node specific configuration data, e.g., radio configuration information and the like. The downloaded configuration from the OSS 204 may include further instructions regarding the connectivity of the eNR 220, for example, information about the further established dedicated bearers in case the eNR 220 is a self-backhauled eNB. This instruction from the OSS 204 may trigger the eNR 220 to execute UE 214 initiated bearer establishment procedures toward the network. In an alternative embodiment, the eNR may not communicate directly to the OSS but rather the anchor eNB may perform the signaling toward the OSS, download the eNR configuration and configure the corresponding data in the eNR via new signaling procedures introduced for this purpose between the anchor eNB and the eNR. In this way, the eNR can remain "hidden" with respect to the OSS.

In order for the network nodes (aNB 218 and MME 208) to be aware that a particular connection is not with a regular UE 214 but rather with an eNR 220, e.g., a wireless relay node, the eNR 220 may use specific markings in the UE 214 capability information which can be uploaded using the legacy UE 214 capability upload procedure from the eNR 220. This enables correct treatment of the eNR 220 by the concerned network nodes (aNB 218 and MME 208). For this case, one can extend the Access Stratum (AS) capabilities (sent to the aNB 218 which includes the radio protocol specific capabilities) and the NAS capabilities (sent to the MME 208 which includes the core network protocol specific capabilities) with the required eNR 220 specific fields. The required eNR 220 specific fields can include at least an indicator for the category type of the node, where a new category type can be defined for the relay nodes, and possibly for the other types of nodes represented by eNR 220. In a further possible embodiment an indicator that the device performing an initial access to the network is not a regular UE but a relay node may be sent already as part of the RRC connection establishment procedure (either in the RRC Connection Request or in the RRC Connection Complete messages). Then the more detailed capability information may be sent later via the legacy UE 214 capability upload procedure from the eNR 220. Alternatively, another method for making the network aware of the eNR 220 is via the subscription information, which may include specific QoS profiles for eNR 220. These QoS profiles could be provided to the desired network nodes by the HSS 210 or policy control system when the APN associated with the eNR 220 is used. This allows the affected network nodes to understand that the "new" wireless relay node is an eNR 220 and to interact with the eNR 220 appropriately, i.e., to treat the eNR 220 as a wireless relay node and not as a UE 214.

The OSS 204 also configures the QoS policy in the PDN GW 212 (which provides the APN to which eNRs connect to), potentially including any additional dedicated bearers that may need to be established for the eNR 220. This may be useful in the case of self-backhauling solutions where the eNR 220 may have multiple bearers with different QoS established. In addition, in the case of self-backhauling eNBs, the OSS 204 may need to configure the backhaul bearer mapping rule(s) in the SGWs 212 used to serve regular UEs 214. This configuration also typically includes the mapping rule(s), i.e., which UE bearer classes (QCI: QoS Class Identifier) correspond to which backhaul bearer classes and their identification on the transport network, e.g., by the appropriate Diffsery codepoint.

The aNB 218, which provides the connection for the eNR 220, may also need to be configured with eNR 220 specific settings, for instance, setting the frequency band that the aNB 218 shall use to schedule user data for UEs 214 connecting via the eNR 220. In order to obtain these settings either the aNB 218 can contact the OSS 204 providing an OSS 204 specific ID of the eNR 220 (potentially received as part of the "UE" capability from the eNR 220) or the OSS 204 may contact the aNB 218 with a cell specific "UE" identity (received from the eNR) to identify the eNR 220 toward the aNB 218.

The final step for configuring the eNR 220 according to this exemplary embodiment occurs when the eNR 220 goes into normal operation in step 306. At this point, the eNR 220 can run self-tests and, with permission from the management system, start normal operations. If the eNR 220 is a repeater, as opposed to e.g., a relay or a self backhauled eNB, the higher layers, e.g., Layer 2 and Layer 3, may potentially be terminated. Additionally, after the potential termination of higher layer connectivity of a relay node toward the network, it may become necessary later for the OSS 204 to reach the relay node again, e.g., to download a new configuration, new software, etc. In order to support this use case, the eNR 220 may remain connected to the network but go into an idle mode (in a similar fashion as done for inactive UEs 214) and wake up only occasionally to monitor the paging channel. When the OSS 204 wants to reach the eNR 220, the network could first page the eNR 220 and, as a response, the eNR 220 could execute the Service Request legacy procedure to go into active mode. After new configuration data is downloaded from the OSS 204, the eNR 220 may be moved into idle mode again.

The above described exemplary embodiments, generally describe systems and methods for obtaining a first set of information which can be used for obtaining basic connectivity to a communications network and a second set of information which describes the specifics for configuring the eNR 220 for use in the communications network. Operations and Maintenance (O&M) information for the eNR 220 can be obtained as a part of the second set of information. According to alternative exemplary embodiments, there can be a third set of information obtained which includes the O&M information, i.e., the configuration data is obtained and then used by the eNR 220 to bootstrap the next connection (which could be a third connection to obtain the O&M information). For example, the eNR 220 could connect through the network to the Software Management Repository distributed Services (SMRS) in the OSS 204 to download basic radio parameters and the O&M enrollment information, then connect to the Registration Authority (RA) in the OSS 204 to enroll the node specific O&M certificate information and then connect to the O&M, also in the OSS 204, to enroll traffic certificate information.

Figure 4:
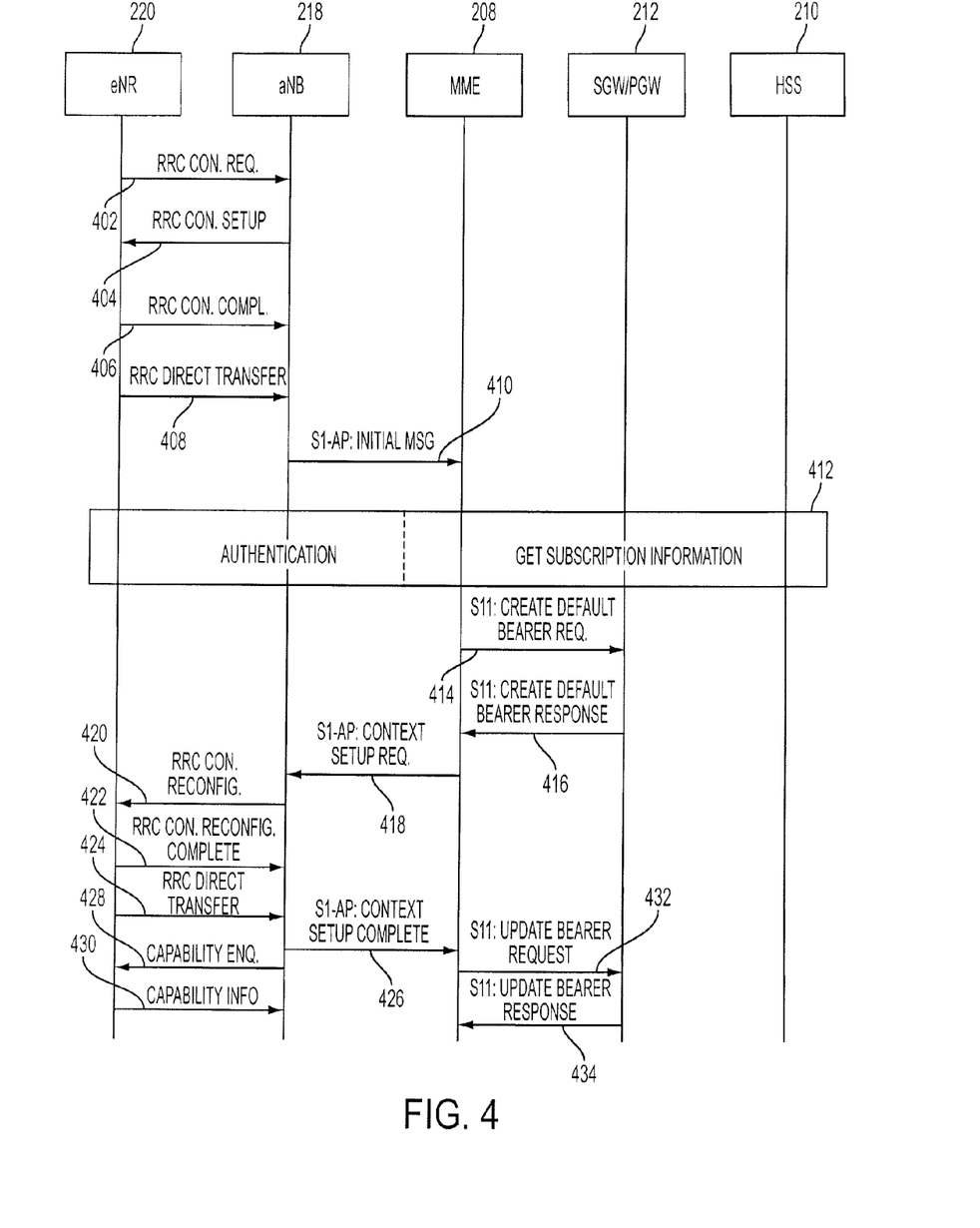
FIG. 4 illustrates a signalling diagram associated with provisioning an eNR according to exemplary embodiments.

According to exemplary embodiments, a signalling diagram is shown in FIG. 4 for connecting (including configuration messages) the eNR 220 to the operator network 202. Initially, eNR 220 transmits a Radio Resource Control (RRC) connection request message 402 to the aNB 218. The aNB 218 then responds to the eNR 220 with an RRC Connection Setup message 404. The eNR 220 then transmits to the aNB 218 both an RRC Connection Complete message 406 and an RRC Direct Transfer message 408 which includes the NAS: Attach Request information. The aNB 218 then sends via S1-Application Protocol (S1-AP), with S1 denoting the interface, an Initial Message 410 to the MME 208. In the case where the MME is integrated into the a-NB, the aNB—MME/PGW/SGW signaling steps are omitted. This Initial Message 410 includes the NAS: Attach Request and is similar to an Initial UE message. At this point authentication of, and the gathering of subscription information for, the eNR 220 occurs as shown by block 412. Additionally, the subscription information may include one of, or both of, the associated PGW address and the local IP address to be assigned to this eNR 220.

The MME 208 then transmits via the S11 interface a Create Default Bearer Request message 414 to the SGW/PGW 212. Here the IP address of the eNR 220 is allocated (if not predetermined and stored with other subscription information) and the SGW/PGW 212 may initiate the setup of the dedicated bearers, which are typically preconfigured in the PGW from the OSS 204. Additionally, it may be the case that no interaction with the Policy Charging Rule Function (PCRF) occurs during this step.

The SGW/PGW 212 then transmits, over the S11 interface, the Create Default Bearer Response message 416 which includes the Create Dedicated Bearer Request to the MME 208. The MME 208 then transmits the Context Setup Request, including the NAS: Attach Accept, to the aNB 218. The aNB 218 then transmits to the eNR 220 an RRC Connection Reconfiguration with NAS: Attach Accept message 420. In response, the eNR 220 transmits to the aNB 218 both an RRC Connection Reconfiguration Complete message 422 and an RRC Direct Transfer message 424 which includes the NAS: Attach Complete information. The aNB 218 then transmits a Context Setup Response message 426 which includes the NAS: Attach Complete information to the MME 208. The MME 208 then transmits an Update Bearer Request message 432 including Create Dedicated Bearer Response information to the SGW/PGW 212. In response, the SGW/PGW 212 transmits an Update Bearer Response message 434 back to the MME 208. Also, after the receipt of the RRC Direct Transfer message 424 the aNB 218 transmits a Capability Enquiry message 428 to the eNR 220 which responds with a Capability Information message 430 which can include additional eNR specific capabilities.

As shown in FIG. 4, initial signalling occurs between the eNR 220 and the aNB 218. In this context, when aNB 218 first receives transmissions from an eNR 220, the eNR 220 can appear to be a UE 214 to the aNB 218. According to exemplary embodiments, the aNB 218 can "discover" that the eNR 220 is in fact an eNR 220 and not a typical UE 214 in various ways. According to one exemplary embodiment, the MME 208 gets subscription information (which is pre-stored) regarding the "new" wireless relay node. The subscription information can include credentials which indicate that this new wireless relay node is an eNR 220. This information then is transmitted back to the aNB 218. According to another exemplary embodiment, when the aNB 218 queries the wireless relay node, the wireless relay node can transmit its capabilities which indicate that is an eNR 220 and not a typical UE 214 requesting a connection.

The above described exemplary embodiments, associated with the flowchart of FIG. 3, describe a provisioning process for wireless relay nodes. However, it will be appreciated by those skilled in the art that such provisioning processes can be implemented with a number of variants, some examples of which are described below.

According to exemplary embodiments, different methods can be used for provisioning an eNR 220, such as, provisioning in a factory or warehouse, using a UICC, using a Mobile Provisioning Device (MPD) or downloading of USIM credentials after initial connectivity with the eNR 220 is established. For security reasons, the eNR 220 USIM application and credentials typically reside in a Trusted Execution Environment (TrE), in a secure element that can be implemented on a smartcard UICC or in an embedded module within the eNR 220. According to exemplary embodiments, one approach is to provision the home operator USIM credentials at the factory where the eNR 220 is manufactured, i.e., eNRs 220 are manufactured on demand for a particular operator. Other alternative exemplary embodiments are broken down into various categories and described below.

Universal Integrated Circuit Card (UICC)

In the case of deploying an eNR 220 with a UICC containing the USIM application and credentials, the eNR 220 typically has a smart card reader or an interface for connecting the reader installed at the factory. The operator can prepare customized UICCs in for example, a warehouse. Each eNR 220 typically has its own UICC which can be placed in its reader for provisioning as well as during regular operation. The contents stored in the UICC can be similar to that of the USIM cards used for femto base stations, i.e., the contents on the UICC can include the traditional USIM credentials, IMSI and secret key, additional configuration data, the operator root certificate, FQDN to Registration Authority in the operator's OSS 204 and a one-time password (OTP) for authentication of enrollment request to the OSS 204.

Also, the eNR 220 typically has a (physical) identifier which it is given while still in the factory. Furthermore, the eNR 220 can use its own public and private keys, which may be provisioned in the factory, but typically are self-generated on board the eNR 220. Additionally, there may be a preferred Public Land Mobile Network (PLMN) designated to force the eNR 220 to connect to certain networks. Alternatively, the connectivity from the eNR 220 pass through other operators' networks. The UICC is inserted into the eNR 220 or its associated card reader preferably during deployment, since the logistics for manufacturer and operator can in this way be decoupled.

Embedded USIM

According to other exemplary embodiments, provisioning can be performed by using an embedded USIM. An eNR 220 is said to be enabled with an embedded USIM when it has been manufactured with an embedded TrE and all the necessary USIM application logic, e.g., stored in an internal memory device (see, e.g., FIG. 5). The USIM credentials and other operator-specific parameters still remain to be provisioned, though the additional configuration data could be provisioned in a manner similar to that described above for the UICC embodiments. Various use cases for using an embedded USIM to configure a wireless relay node according to exemplary embodiments are described below.

According to exemplary embodiments, an embedded USIM may be provisioned to the eNR 220 in an operator warehouse or by a trusted $3^{rd}$ party, before being shipped to site and deployed. Alternatively, and less time consuming for the operator, the eNR 220 can be enabled with an embedded USIM in place from the factory which allows the operator to only provision the USIM credentials and other configuration data.

According to exemplary embodiments, for the case when the eNR 220 is enabled with an embedded USIM from a factory, the embedded USIM in the eNR 220 can be provisioned during deployment on site either using an MPD or via an MPD modem. An MPD is an active device which securely connects to the eNR 220 using a local connectivity, e.g., Near Field Communication (NFC), Bluetooth, IR, serial interface, USB, Ethernet/LAN and the like, to upload the relevant data.

This exemplary embodiment typically requires that the eNR 220 includes an appropriate communications interface.

According to exemplary embodiments, there are two sub-cases for using an MPD to provision an embedded USIM: MPD Offline and MPD Online. For MPD Offline, the USIM credentials and other data are already stored on the MPD. No coverage is needed, at this instant, to fetch the USIM credentials. For MPD Online, the MPD connects securely to the operator network 202 and downloads relevant USIM credentials and other data. This connection relies on wireless communication coverage at the eNR 220 deployment site, since that is the only connectivity which can be assumed at the eNR 220 site. The MPD can, for example, be an LTE mobile phone or an LTE-equipped laptop of the person doing the installation which can use a Java application to select configuration.

By way of contrast, according to other exemplary embodiments, when the MPD is used as a modem, the eNR 220 connects via the MPD to the operator network 202 for download of relevant soft USIM credentials and other operator data. This connection also relies on wireless coverage being available on site. The modem may, for example, be the LTE mobile phone or LTE-equipped laptop of the person doing the installation. In this case the eNR 220 is the active party and the modem is mainly providing temporary connectivity. Since the modem/mobile belongs to the operator personnel (e.g., has a known MSISDN/IMSI) this provides an option for nodes in the operator's network 202 to verify the legitimacy of the request. Additionally, the eNR 220 can present its own identity (device identifier) in order to identify the USIM credentials to be downloaded. For the cases where the eNR 220 has its own private and public encryption keys, and where the mapping between device identifier and public key is known to the home operator out-of-band, the USIM credentials can be encrypted by the home operator with the eNR's 220 public key.

According to other exemplary embodiments, in order to avoid on-the-field operations using an MPD, the eNR 220 can, alternatively, use a one-time-USIM for auto-provisioning over the mobile network. The one-time USIM is typically embedded in the eNR 220 at the time of manufacture using the credentials of an RO 226. This approach follows a concept similar to that developed in the context of Machine to Machine (M2M) communications as described in 3GPP TR 33.812 which describes the deployment and remote management of devices without human interaction. In one instance, the device, e.g., eNR 220, comes pre-provisioned with preliminary credentials from an RO 226. One can think of the pre-provisioned data as being similar to a one-time-USIM issued together with an address to RO 226 service. For example, there is an identifier called a Provisional Connectivity ID (PCID) and a secret key which are analogous to the traditional IMSI and corresponding secret key which could be used. Additionally, the RO's 226 FQDN can also be provisioned to the eNR 220. Other exemplary embodiments based on the use of a one-time USIM are described below.

According to exemplary embodiments USIM information can be downloaded by using an approach that is similar to an application described in the M2M TR 33.812, i.e. at deployment, the eNR 220 can gain connectivity using any "visited operator", contact the RO 226 discovery service and get redirected to the Selected Home Operator (SHO), to which it can set up a secure connection. In M2M, the typical purpose for this is to download USIM credentials to the device.

According to another exemplary embodiment, the previously described exemplary embodiment for downloading USIM information can be enhanced by assuming that the eNR 220 is aware of optimization paths. There are some exemplary alternatives. One exemplary alternative is that an external RO 226 is used for authenticating the initial connection, but without using the RO 226 discovery service and instead goes directly to the SHO. The idea here is to use "standard" M2M equipment (in the eNR 220), but let the operator network fake the various re-directions. Another way is to let MME 208 detect that the attaching eNR 220 is in its home network and inform the device to fetch the USIM from a FQDN provided in-line or derived using well-defined generation procedures.

According to other exemplary embodiments, the eNR 220 could be informed via signaling that it has attached to its home network and can directly contact its provisioning server whose FQDN is provided in-line or derived internally. This may require provisioning restrictions of PLMNs for the one-time-USIM. Alternatively, contacting the RO 226 can be avoided by designing a special procedure whereby the attached eNR 220 is forwarded directly to the node from which a USIM may be downloaded, which may also require restrictions of PLMNs.

According to yet another exemplary embodiment, a push version of downloadable USIM information can be used for discovery service at the RO 226. This approach can be achieved using Automatic Device Detection (ADD), as described in TS 22.101, which detects when an eNR 220 is attached to the network using the one-time USIM. Thus, once the eNR 220 is attached and authenticated to a network, the ADD procedures make the Home Location Register (HLR) aware of the eNR's 220 IMEI/IMSI. Then, the HLR notifies the OSS 204 about the new eNR 220. The OSS 204 then uses any available bearer to push, for example, FQDN, credentials, etc., of the server to the eNR 220 so that it can download its USIM credentials and other operator data.

Figure 5:
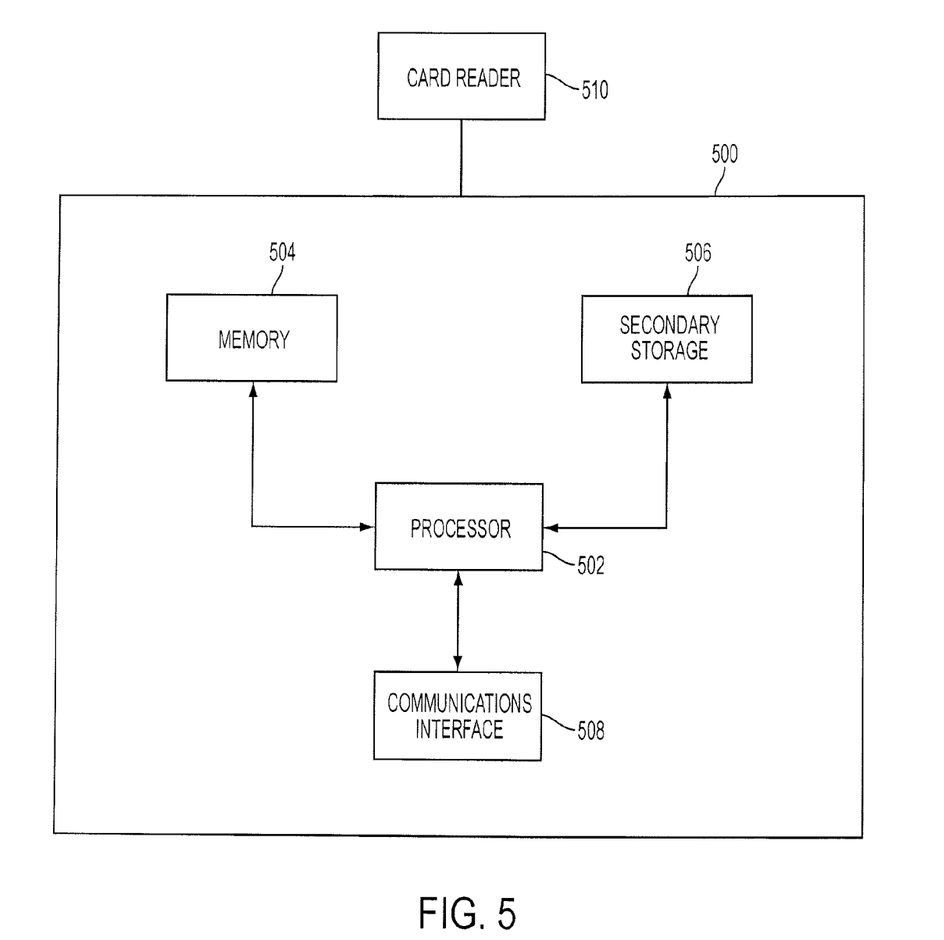
FIG. 5 depicts a communications node according to exemplary embodiments.

The exemplary embodiments described above provide methods and systems for provisioning wireless relay nodes, e.g., eNRs 220, which are a part of the network infrastructure. As shown in FIG. 5, communications node 500 can contain a processor 502 (or multiple processor cores), memory 504, one or more secondary storage devices 506 and a communications interface 508. Communications node 500 is capable of processing instructions in support of performing the duties of the functions associated with an eNR 220. For example, configuration information as described in the various exemplary embodiments described above can be stored in either memory 504 or secondary storage devices 506, i.e., the secondary storage 506 could include an embedded USIM. Also, pre-provisioned information could be stored in either memory 502 or the secondary storage 506. Additionally, the communications interface 508 can communicate over the same interface for provisioning and configuration of the node 500 as well as for communicating with UEs 214. Thus communication node 500 can be an eNR 220. Additionally, a card reader 510 can be in local communications, e.g., through communications interface 508, with communication node 500 for reading information from a UICC and the like. Card reader 510 can also, in some exemplary embodiments, perform the functions of MPDs as described above. Alternatively, card reader 510 can be integrated as a part of communication node 500. An eNR 220 differs from, for example, a UE 214 in many ways. For example, an eNR 220 can be active for long periods of time, e.g., days, whereas a UE is often actively connected to a network for shorter periods of time, e.g., the duration of a phone conversation, also they perform different functions.

Figure 6:
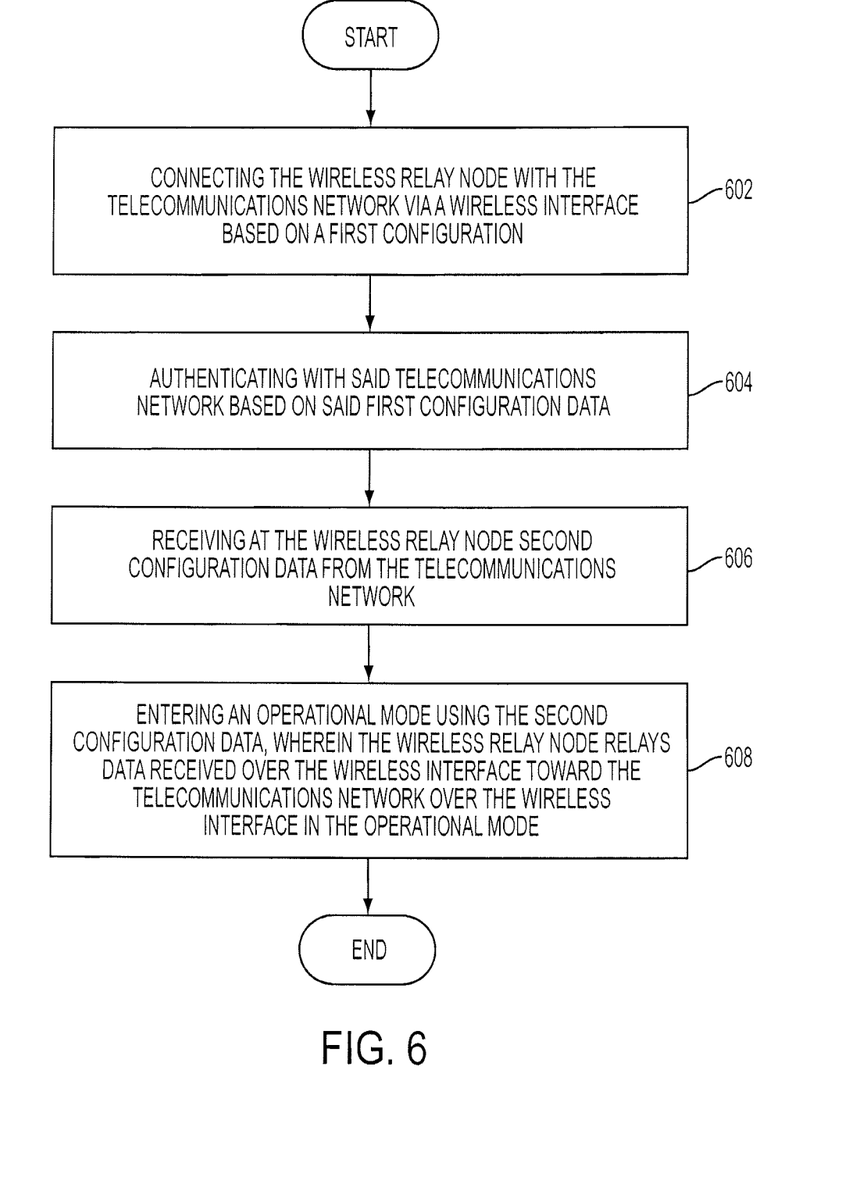
FIG. 6 shows a method flowchart for configuring a wireless relay node according to exemplary embodiments.

Utilizing the above-described exemplary systems according to exemplary embodiments, a method for configuring a wireless relay node is shown in the flowchart of FIG. 6.

Initially a method for configuring a wireless relay node in a telecommunications network includes: connecting the wireless relay node with the telecommunications network via a wireless interface based on a first configuration data in step 602; authenticating the wireless relay node with the telecommunications network based on the first configuration data in step 604; receiving at the wireless relay node a second configuration data from the telecommunications network in step 606; and entering an operational mode using the second configuration data wherein the wireless relay node relays data received over the wireless interface toward the telecommunications network over the wireless interface in the operational mode in step 608.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. For example, in the further evolution of LTE (the so-called LTE-Advanced) multi-hop structures, e.g., a "chain" of eNRs 220 providing access for UEs, could use various exemplary embodiments described above. No element, act, or instruction used in the description of the present application should be construed as critical or essential to the invention unless explicitly described as such. Also, as used herein, the article "a" is intended to include one or more items.

The invention claimed is:

1. A method in a wireless relay node for connecting said wireless relay node to a telecommunications network, the method comprising:
    obtaining first configuration data by inserting into said wireless relay node a Universal Integrated Circuit Card (UICC) including said first configuration data, or by activating an embedded Universal Subscriber Identity Module (USIM) located within said wireless relay node, said activation including provisioning USIM credentials with said first configuration data;
    connecting with said telecommunications network via a wireless interface based on first configuration data, wherein said wireless interface is also used by user equipment to transmit and receive data;
    authenticating, by said wireless relay node, with said telecommunications network based on said first configuration data;
    receiving, at said wireless relay node, second configuration data from said telecommunications network;
    entering, by said wireless relay node, an operational mode using said second configuration data; and
    relaying, by said wireless relay node, data received from said user equipment via said wireless interface toward said telecommunications network over said wireless interface,
    wherein said steps of connecting and authenticating use a connection mechanism and an authentication mechanism, respectively, which are present in said telecommunications network and which mechanisms are also used for connecting and authenticating said user equipment; and
    wherein said connection mechanism is a UE Attach procedure and said authentication mechanism is a Universal Service Identity Module (USIM) procedure.

2. The method of claim 1, wherein said first configuration data includes a physical identifier of said wireless relay node, public key certificates and address information associated with a configuration server, and wherein said second configuration data includes radio configuration data and a local Internet Protocol (IP) address.

3. The method of claim 1, further comprising:
    selectively configuring other network nodes with information regarding said wireless relay node.

4. The method of claim 3, wherein said other network node is at least one of an eNodeB which is transmitting information received by said wireless relay node and a Mobility Management Entity (MME).

5. The method of claim 1, wherein said wireless relay node is at least one of a relay, a repeater and a self-backhauled eNodeB.

6. The method of claim 1, wherein said embedded USIM is provisioned in an operator warehouse.

7. The method of claim 1, wherein said embedded USIM is provisioned through the use of a Mobile Provisioning Device (MPD) during deployment of said wireless relay node.

8. The method of claim 7, wherein said MPD is used as at least one of an MPD offline mode, an MPD online mode or an MPD modem.

9. The method of claim 8, wherein said MPD offline mode includes using USIM credentials and other data which have been pre-stored on said MPD.

10. The method of claim 8, wherein said MPD online mode includes having said MPD connect to an operator network and download USIM credentials and other data.

11. The method of claim 8, wherein said wireless relay node uses said MPD modem as a modem to connect to an operator network and downloads USIM credentials and other data.

12. The method of claim 1, wherein said first configuration data is obtained by:
    providing a one time Universal Subscriber Identity Module (USIM) located within said wireless relay node with credentials of a registration operator (RO), wherein said credentials include a fully qualified domain name (FQDN) of said RO.

13. The method of claim 1, wherein Operation and Maintenance information is obtained as part of said second configuration data.

14. The method of claim 1, further comprising:
    receiving at said wireless relay node third configuration data from said telecommunications network, wherein said third configuration data includes Operations & Maintenance information, further wherein said step of entering an operational mode uses both said second configuration data and said third configuration data.

15. The method of claim 12, wherein said RO performs a discovery service and redirects said wireless relay node to a selected home operator (SHO) based on said discovery service which sets up a secure connection with said wireless relay node for transmitting said first configuration data to said wireless relay node.

16. The method of claim 12, wherein said RO authenticates an initial connection from said wireless relay node and redirects said wireless relay node to a selected home operator (SHO).

17. The method of claim 1, wherein said first configuration data is obtained by:
    receiving signalling indicating that said wireless relay node is attached to its home network; and
    providing a one time Universal Subscriber Identity Module (USIM) located within said wireless relay node with a fully qualified domain name (FQDN) of a provisioning server.

18. A wireless relay node comprising:
- an embedded Universal Subscriber Identity Module (USIM) located within said wireless relay node for obtaining first configuration data by activating said USIM, and wherein said activation includes provisioning USIM credentials with said first configuration data;
- a processor configured to use first configuration data to allow said wireless relay node to use a UE Attach procedure to connect wirelessly to a telecommunications network via a wireless interface which is also used by user equipment to transmit and receive data, wherein said wireless relay node uses a USIM procedure to authenticate with said telecommunications network using said first configuration data; and
- a communications interface which is configured to receive second configuration data from said telecommunications network,
- wherein said processor uses said second configuration data to configure said wireless relay node for normal operations, further wherein said wireless relay node then enters an operational mode where said wireless relay node relays data received from a user equipment over said wireless interface toward said telecommunications network via said same wireless interface.

19. The wireless relay node of claim 18, wherein said wireless relay node is at least one of a relay, a repeater and a self-backhauled eNodeB.

20. The wireless relay node of claim 18, further comprising:
- a one time Universal Subscriber Identity Module (USIM) located within said wireless relay node with credentials of a registration operator (RO), wherein said credentials include a fully qualified domain name (FQDN) of said RO, and wherein said credentials are used as said first configuration data.

21. The wireless relay node of claim 18, further comprising:
- one time Universal Subscriber Identity Module (USIM) located within said wireless relay node, wherein said first configuration data is obtained by receiving signaling indicating that said wireless relay node is attached to its home network and provisioning said USIM with a fully qualified domain name (FQDN) of a provisioning server.

* * * * *